Nov. 2, 1965 R. W. FORSYTH ETAL 3,215,219
ARTICULATED VEHICLE
Filed July 22, 1963 8 Sheets-Sheet 1

INVENTORS.
ROBERT W. FORSYTH
JOHN P. FORSYTH
BY
George C. Sullivan
Agent

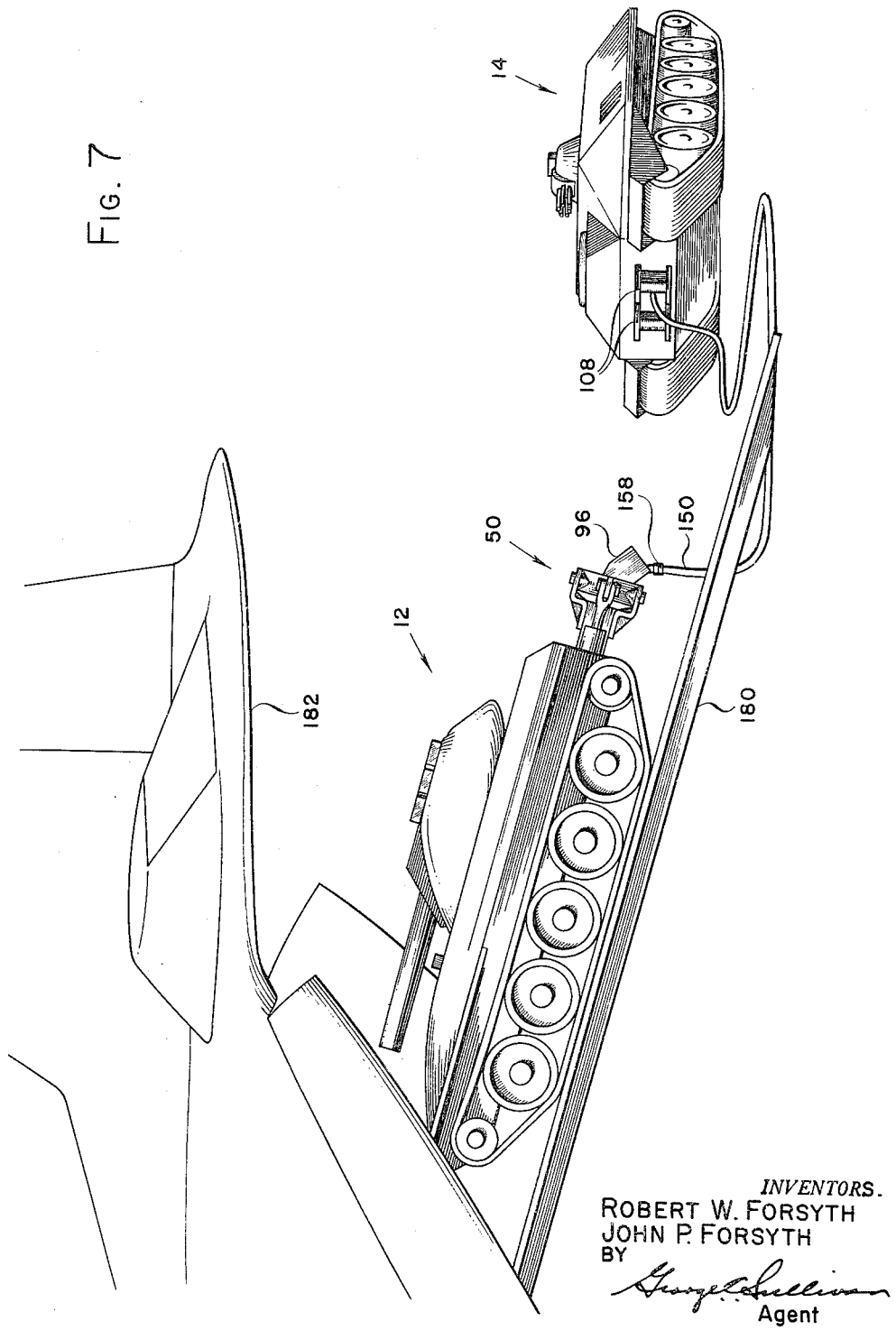

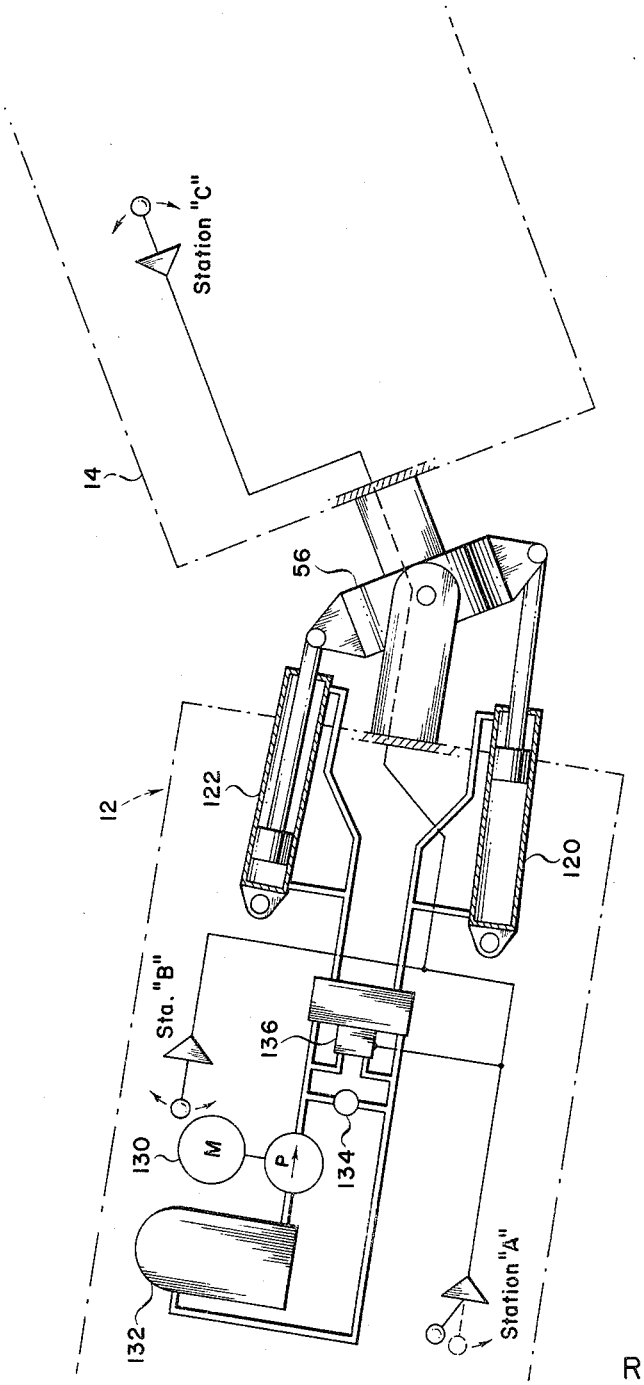

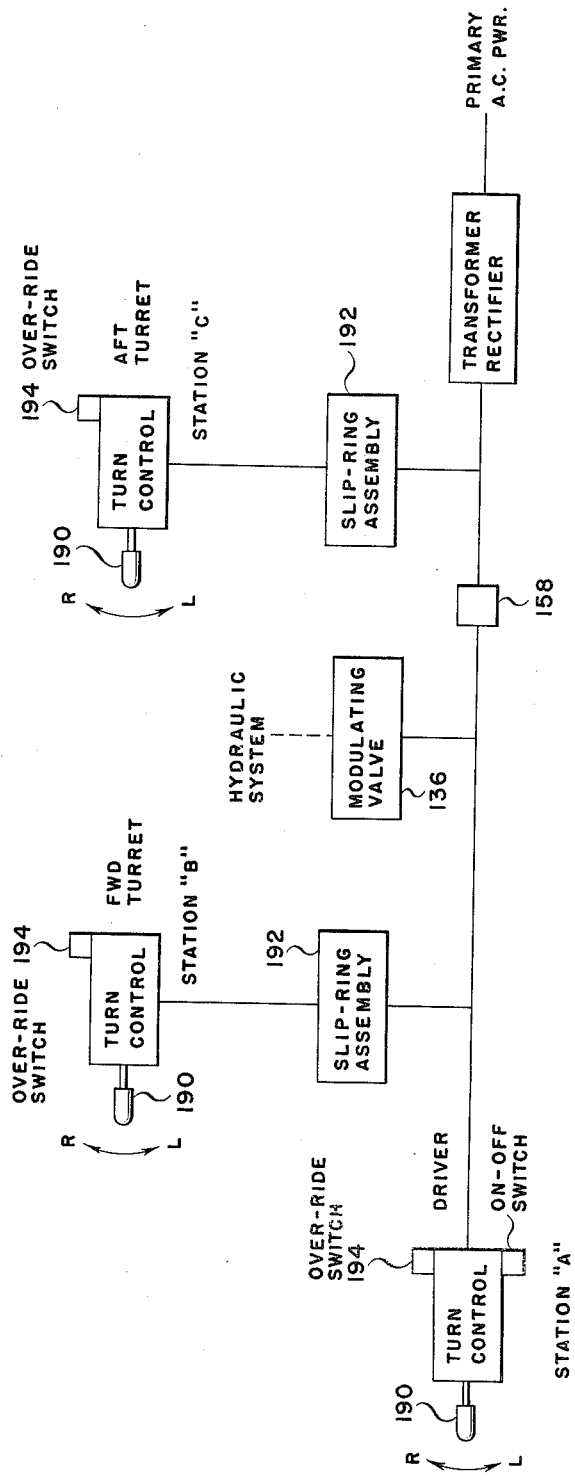

United States Patent Office 3,215,219
Patented Nov. 2, 1965

3,215,219
ARTICULATED VEHICLE
Robert W. Forsyth and John P. Forsyth, Burbank, Calif., assignors to Lockheed Aircraft Corporation, Burbank, Calif.
Filed July 22, 1963, Ser. No. 296,781
10 Claims. (Cl. 180—14)

This invention relates to improvements in articulated vehicles.

The articulated vehicles of the present invention have leading and trailing vehicle elements connected by a coupling mechanism which permits independent pitch and roll movements of the elements over uneven terrain. Also, associated with the coupling mechanism is a hydraulic actuator system which provides for articulated steering of the elements. A similar articulated vehicle has been described and claimed in U.S. Patent 3,035,654, issued on May 22, 1962. The articulated vehicles of the present invention can be broadly distinguished therefrom by improvements in the steering and coupling mechanism and in the power means for such vehicles. Whereas a mechanical drive system is contemplated for use in the patented vehicles, the vehicles of the present invention are powered by electrical means. The improved coupling mechanism of the present invention together with the electrical power system provides for a vehicle having elements which can be detached and moved independently of each other, with only an electrical conduit connecting the elements. Such a separation of the elements provides for significant advantages over vehicles of the prior art, as will be apparent hereinafter.

The present invention can be stated broadly as residing in an articulated vehicle having a leading element and a trailing element, a coupling mechanism for connecting said elements and for providing independent pitch and roll movement of the elements, electro-hydraulic means for articulated steering of the elements, a source of electrical power, and electrical means for driving said elements.

The present invention also resides in an improved coupling and steering mechanism for an articulated vehicle. This mechanism includes a two-member ring assembly for coupling draft members on each of the vehicle elements and for providing independent pitch and roll movement of the elements. The ring assembly has an outer annular member with external attachment points on its vertical axis for pivotal attachment to one of the draft members; an inner annular member which is concentric with the outer member and is adapted to rotate therein for independent roll movement of the elements; a vertical column centrally disposed in the inner member; and horizontal pivot pins mounted centrally in the sides of said column and the adjacent portion of the inner member. The other of said draft members has a yoke member which is pivotally mounted on the horizontal pins thereby permitting independent pitch movement of the elements. Steering of the vehicle is accomplished by hydraulic actuator means horizontally disposed on each side of the first-mentioned draft member and pivotally connected to the ring assembly so as to move the ring assembly about its vertical axis. The pivotal movement of the ring assembly in turn moves the elements into angular relationship with each other, permitting turning of the vehicle.

Other features and advantages of the present invention will become more apparent from the following detailed description of a main battle tank constituting an embodiment of the invention. Such a tank is shown in the accompanying drawings wherein:

FIGURE 5 is an enlarged perspective view of a central column in the coupling and steering mechanism;

FIGURE 7 is a perspective view showing the tank with its leading element detached from the traling element except for a power connection;

FIGURE 8 is a schematic diagram of a steering system shown in position for a right turn; and FIGURE 9 is a schematic block diagram of the electrical control means for the steering system.

*Two element tank*

Figure 1:
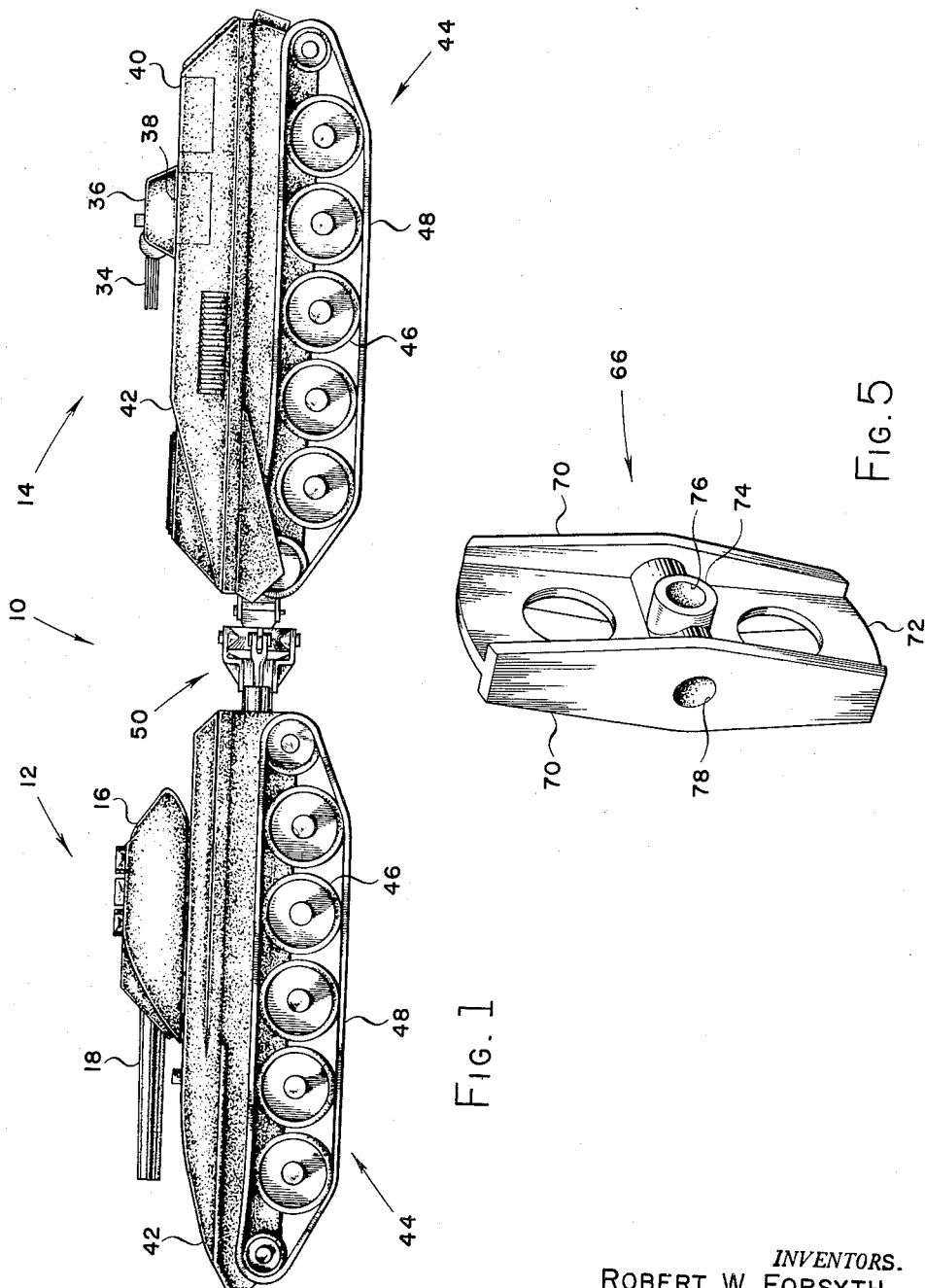
FIGURE 1 is an elevation view of a main battle tank in accordance with the present invention.
Figure 2:
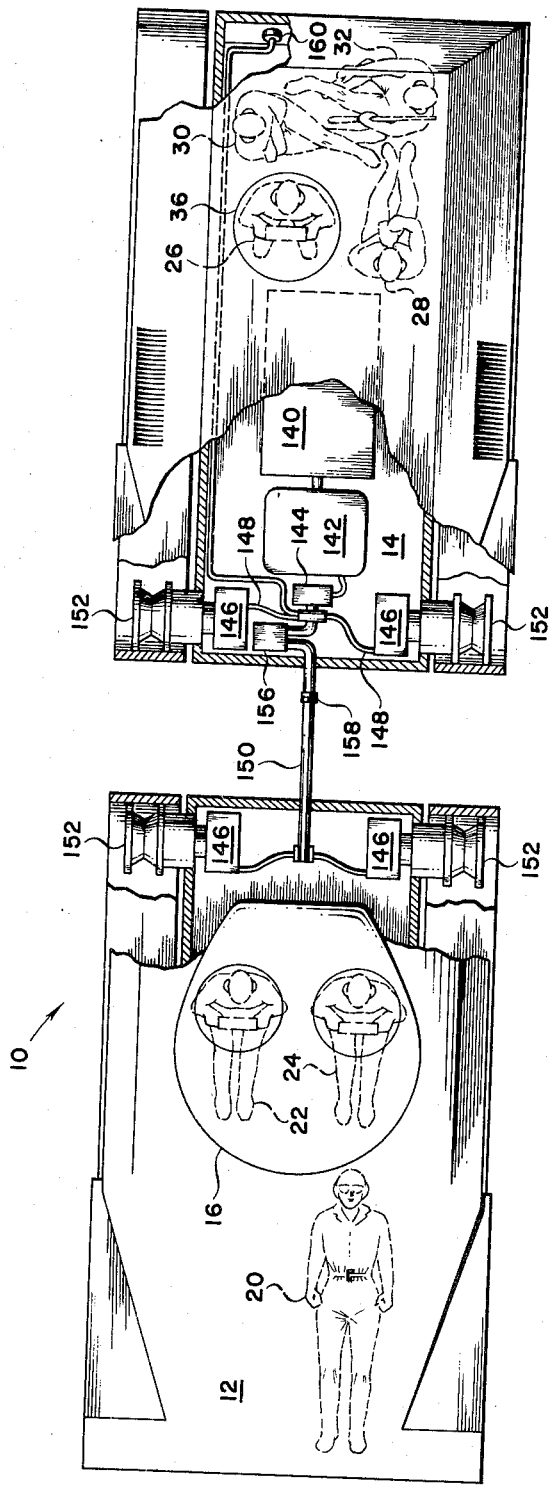
FIGURE 2 is a top view of the tank, showing personnel stations and a schematic of the electrical power system.

FIGURE 1 shows a low silhouette, articulated main battle tank 10 in the gross weight class of about 22 tons. Tank 10 is divided into a leading element 12 and a trailing element 14 so that its gross weight is distributed over a greater area, permitting the tank to operate over terrain, which would otherwise be marginal or impassable for conventional tanks. Leading element 12 serves in the same capacity as a conventional tank; that is, it carries the main armament, here represented by turret 16 and guns 18. Element 12 carries a complement of three crew members. The latter are represented in FIGURE 2 as the tank driver 20, shown in a supine position, a gunner-loader 22, and a tank commander 24.

Trailing element 14 is designed principally to carry tank support personnel, stores, and the tank power plant. The tank support personnel are represented in FIGURE 2 as crew members 26, 28, 30 and 32. Element 14 also carries secondary armament, here represented by an anti-personnel type gun 34 carried in turret 36 (FIGURE 1). Element 14 is also provided with hatch covers, represented by 38, 40, at the sides and rear of the crew compartment, which can be opened for additional support fire by the crew members. Element 14 is also provided with a door (not shown) at the rear of the element through which the crew members can dismount and attend to various tank support activities, such as clearing road blocks, removing mines, detecting and engaging enemy infantry, tank-killer teams, and establishing defensive positions should the tank be immobilized.

Both elements 12, 14 have frontal and side protective armor represented generally by 42. An armor construction which can be used in the present tank is further described in co-pending application Serial No. 291,768 filed July 1, 1963 and assigned to the same assignee as the present application. Both elements are mounted on a flat-track suspension system, generally represented as 44, which employs large diameter road wheels 46 and a long-pitch, flexible cable, endless band track 48. This system gives the greatest mobility over a wide variety of terrain conditions. However, for other applications of the present articulated vehicle, the vehicle elements may be provided with a multi-axle wheel system in place of the track system.

The tactical advantages of the present tank over conventional tanks will be apparent. With the present tanks operating in company or platoon strength, the unit commander would have immediately available an infantry maneuver group of from 15 to 40 well armed men, fresh and ready for combat. There would be no need to wait for armored personnel carrier or walking infantry to catch up with the tank unit.

Coupling and steering mechanism

Figure 3:
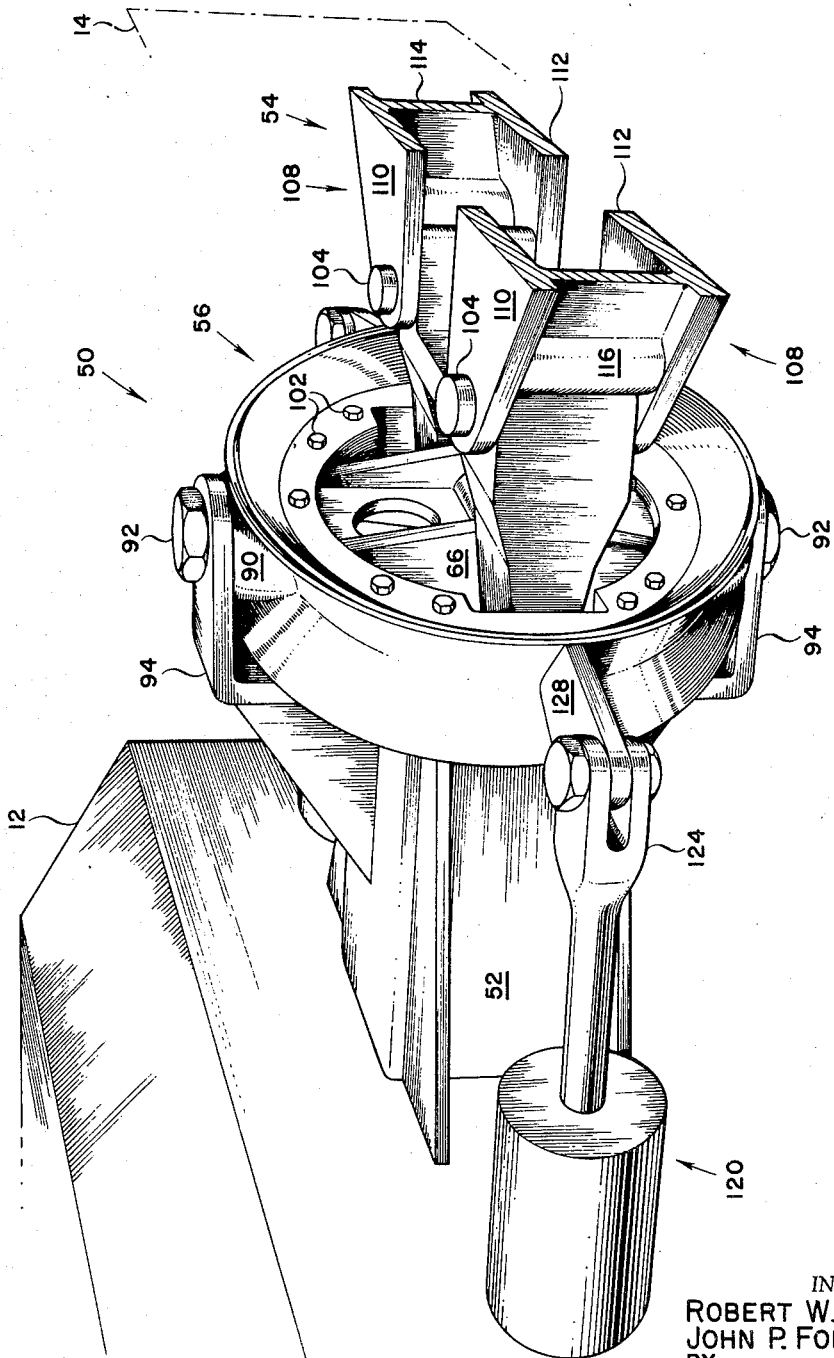
FIGURE 3 is a perspective view of a coupling and steering mechanism in accordance with the present invent.
Figure 4:
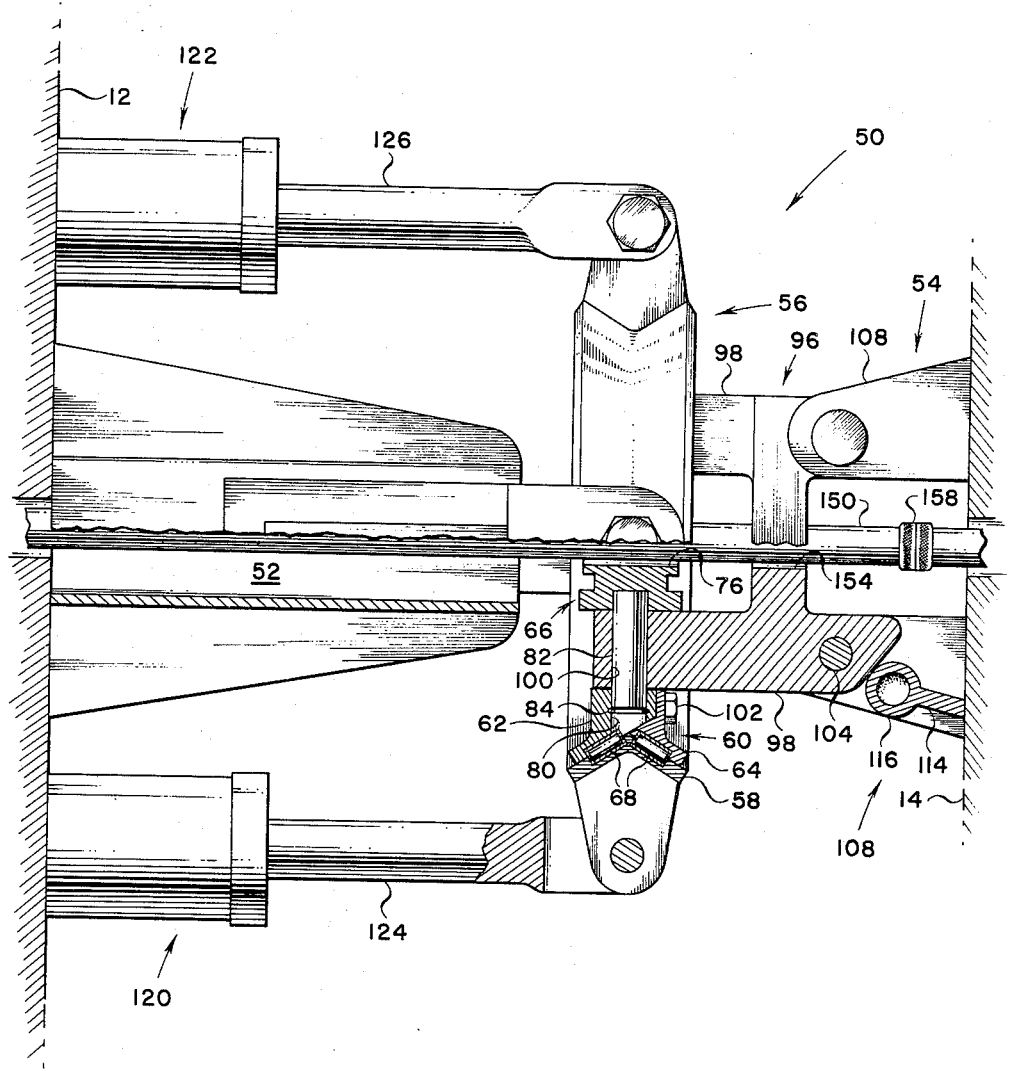
FIGURE 4 is a plan view of the coupling and steering mechanism, partly in section.

Elements 12 and 14 are joined by a coupling and steering mechanism shown generally as 50 in FIGURES 3 and 4. Mechanism 50 is comprised of a tubular draft member 52 rigidly attached to the rear of the leading element 12, a second draft member shown generally as 54 rigidly attached to the front of the trailing element 14, and a ring assembly shown generally as 56. Assembly 56 couples the two draft members 52, 54, and thus the two elements 12, 14, and provides for independent pitch and roll movement of the elements. It also serves as a pivot member for steering movement of the tank.

More specifically, ring assembly 56 is comprised of an outer ring member 58 having a V-shaped cross section, an inner ring member 60 having a forward component 62, an aft component 64, and a central upright column 66. Inner ring member 60 is concentric with the outer ring member 58 and is adapted to rotate therein by means of roller bearings 68 carried by components 62 and 64. Column 66 is centrally placed within component 62 and is made integral with it, as by welding. As shown in FIGURE 5, column 66 is comprised of sides 70 and a central web 72. Web 72 has a central boss 74 projecting from both sides of the web and having an opening 76. Sides 70 and forward component 62 have horizontal openings 78 and 80, respectively, adapted to receive horizontal pivot pins 82 which lie in line with the center of the ring assembly. Pins 82 are held in place in the openings by retaining snap rings 84 inserted into component 62.

Ring assembly 56 is pivotally attached to draft member 52 by means of attachment lugs 90 on the exterior of outer ring 58 and vertical pivot pins 92 held in brackets 94 rigidly attached to draft member 52 at its free end. Pins 92 fitting into lugs 90 define a vertical pivot axis for the ring assembly.

Ring assembly 56 is also pivotally attached to draft member 54 which comprises an H-shaped yoke member 96 and brackets 108 rigidly attached to the front of the trailing element 14, as by welding. The specific manner in which yoke member 96 and brackets 108 are coupled for quick attachment and detachment of the vehicle elements will be described hereinafter. Yoke member 96 has arms 98 which are adapted to be inserted between sides 70 of the column 66 and the inner ring components 62, 64. Arms 98 have openings 100 into which pins 82 may be fitted. The order of assembly of the yoke 96 and the ring member 56 is to align openings 100 in the yoke arms 98 with the openings 78 and 80 respectively in the column sides and forward component 62 and then insert pins 82. After retention of the pins with snap rings 84, the forward and aft components 62, 64 are brought together and held by mounting bolts 102.

Thus, it will be apparent that the elements 12 and 14 can pitch independently of each other about the horizontal pivot axis defined by horizontal pivot pins 82. The two elements can also roll independently of each other by virtue of the rotation of inner ring member 60 within outer ring 58. Independent pitch and roll movements of the two elements permit them to conform to the terrain so that their respective loads are transmitted to the ground and not to a structural member as would be the case where there is no freedom of movement between the elements.

Although the present coupling and steering mechanism have been described and shown as being attached to the leading and trailing elements 12, 14 in a certain manner, it will be apparent that the present mechanism can be attached to these elements in a reverse manner. That is to say, actuators 120, 122 and the draft member 52 can be attached to the front of the trailing element 14 and the draft member 54 can be attached to the rear of the leading element 12 without departing from the scope of the present invention.

Electrical power system

The electrical power system for the tank provides a relatively simple system when compared to the heavy and complex torque converter drive systems found in present day tanks. These drive systems, when applied to an articulated vehicle, would require an elaborate universally-jointed drive shaft, which would be difficult to disconnect.

FIGURE 2 shows schematically the electrical power system for the present tank. It includes a mechanical prime mover 140 which may be any suitable piston engine or a gas turbine. Prime mover 140 drives an alternator 142 which produces variable frequency A.C. power. This power is fed into frequency changer 144, a static switching device which converts variable frequency A.C. power into single phase constant frequency A.C. power. The converted power is then sent to the traction motors 146 through electrical conduits 148 and 150. Individual traction motors 146 are provided at the rear of element 12 and the front of element 14 for each traction drive sprocket 152.

As shown in FIGURE 4, conduit 150 passes through an opening 154 in yoke member 96, through opening 76 in column 66 and through draft member 52 into element 12 for connection to traction motors 146. Conduit 150 is an armored cable, and is provided with sufficient length, as by a reeling arrangement 156 (FIGURE 2), so that the conduit may be extended when the vehicle elements are detached. Conduit 150 also has connector means 158 adjacent draft member 54, which can be readily disconnected. Rear element 14 is also provided with a rear electrical connection or receptacle 160 whereby power from another element or source may be supplied to the tank.

Figure 6:
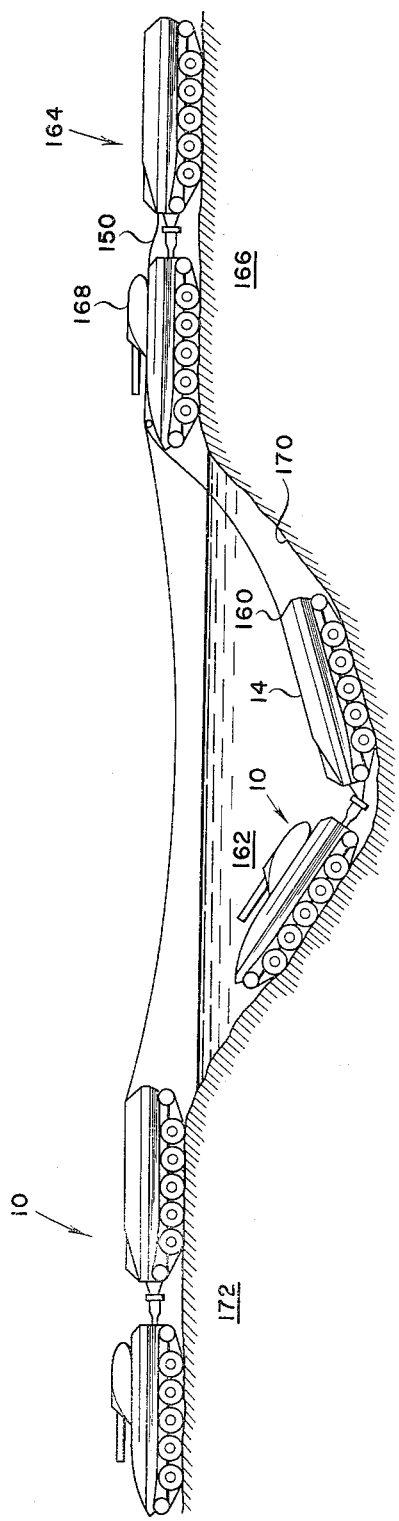
FIGURE 6 is a sketch showing how two of the present tanks cooperate in crossing a river.

A useful attribute of the present tank made possible by the electrical power system is illustrated in FIGURE 6 wherein tank 10 is shown crossing a stream or narrow river 162 with the aid of a companion tank 164 suitably concealed on the river bank 166. In this situation, tank 10 is prepared for crossing stream 162 to the opposite bank 172 by shutting off its power system, closing all its openings, and turning on the oxygen system, if required. Power for tank 10 is supplied by tank 164 and transmitted through its extendable conduit 150 which has now been placed over leading unit 168 and connected to rear receptacle 160 on trailing unit 14. Tank 10 now uses the so-called "bottom crawling" technique and maneuvers along the river bed 170 until it reaches the opposite bank 172. It then starts up its own power system and transmits power back to tank 164 through conduit 150. Tank 164 then proceeds to cross the river 162 in like manner. Conduit 150 may be reeled into tank 10 as tank 164 progresses along the river bed. Once upon bank 172, both tanks 10 and 164 can proceed under their own power.

Detachment of vehicle elements

As previously mentioned, the separability feature of the present articulated vehicles offers significant advantages over vehicles of the prior art. For example, with conventional tanks, their high mass concentrations make air shipment impossible in current cargo aircraft. Therefore, their tactical usefulness is severely limited. In contrast, the present tank can be separated into its two elements and each element can be loaded onto a cargo aircraft without the use of special equipment.

As shown in FIGURES 3 and 4, yoke member 96 and brackets 108 comprising draft member 54 are adapted for quick detachment and attachment of elements 12 and 14. Brackets 108 have upper and lower flanges 110, 112, a web 114, and a tubular portion 116 integral with the web. Arms 98 of yoke member 96 fit between flanges 110, 112 and abut against tubular portion 116. Member 96 and brackets 108 are held integral by means of quick release pins 104. By removal of pins 104, elements 12 and 14 are readily separated.

FIGURE 7 illustrates how the separated elements 12 and 14 can be loaded onto a cargo aircraft 182. With electrical conduit 150 connected and arranged for extension, the forward element 12 can be powered by trailing element 14 and proceed onto the loading ramp 180 of the aircraft 182. When the leading element 12 is loaded on the aircraft, connector means 158 on conduit 150 is disconnected, and the conduit is reeled back into element 14. Element 14 can then proceed under its own power into another cargo aircraft. Thus, complete air mobility of the present tank is possible.

Another instance where the separability feature of the present tank is useful in crossing bridges or terrain with limited bearing capacity. Whereas passage of conventional main battle tanks may be prevented, because of their high loading concentration, the present tank can be separated into its elements and proceed across the bridge or terrain, element by element.

*Electro-hydraulic steering system*

The present tank employs an electro-hydraulic steering system for articulated steering of the vehicle elements. Articulated steering avoids the power losses, the rapid track wear, and the dangerous overstressing of marginal terrain while maneuvering, which are associated with the usual skid steering of conventional tanks.

More specifically, as shown in FIGURES 3 and 4, steering movements of the two elements are accomplished by pivotal movement of the ring assembly 56 about the vertical axis defined by pins 92. Ring assembly 56 is connected to hydraulic rams, generally indicated as 120, 122, which are rigidly mounted within element 12 and are horizontally disposed on each side of the draft member 52. Rams 120, 122 have arms 124, 126 which are pivotally connected to horizontally disposed external lugs 128 attached to the outer ring member 58. Extension of one of the rams and the simultaneous retraction of the other ram will cause ring assembly 56 to pivot about its vertical axis and the two vehicle elements to assume an angular relationship to each other. For example, as shown in FIGURE 8, extension of ram 120 and retraction of ram 122 will cause turning movement of the vehicle to the right. Rams 120 and 122 are actuated by a conventional hydraulic system schematically shown in FIGURE 8 as being comprised of an electrical motor and pump 130, a fluid reservoir 132, a relief valve 134, and a servo-control valve 136.

The electrical control means for actuating valve 136 and the steering control system in general will now be described in conjunction with FIGURES 2 and 9. The tank is normally driven by crew member 20 in leading element 12, with the aid of conventional optical devices (not shown). His station and the controls therein are designated as Station "A." In the event of his disability, the gunner-loader 22 or the tank commander 24 can drive the tank by means of secondary driving controls placed in turret 16, designated as Station "B." Additional secondary controls are placed in turret 36 in the trailing element, Station "C," to facilitate driving of the tank when the tank is in a withdrawing maneuver with the main armament covering the withdrawal or when the tank is on a narrow road or ravine where turning of the tank is prohibited. However, forward and reverse driving of the tank is possible at all stations.

Steering control is exercised at each of the stations by right and left movements of a control lever 190 to give corresponding vehicle movement. At Stations "B" and "C," appropriate cam means and connections in slip ring assemblies 192 are provided so that regardless of the orientation of the turrets 16 and 36, whether in normal forward position or in reverse, control levers 190 are moved in the same directions; that is, to the right for a right turn and to the left for a left turn. Slip ring assemblies 192 also provide for automatic lockout of the non- operating driving stations. In the event of an emergency at the operating station, manual override switches 194 are provided at each of the other stations to permit vehicle control. The control inputs at the respective stations actuate servo-hydraulic valve 136 in known manner to provide appropriate hydraulic fluid flow to and from actuators 120 and 122.

Although the present invention has been described by using a main battle tank, as an example, it will be apparent to those skilled in the art that, with suitable modifications, the present articulated vehicle can also be adapted to carry cargo and missiles, personnel, or perform general utility missions. Such vehicles may have two or more elements. Accordingly, it is to be understood that the scope of the present invention is to be limited only by the appended claims.

We claim:

1. A coupling and steering mechanism for an articulated vehicle having a leading element and a trailing element, said mechanism comprising: a tubular draft member rigidly attached to the rear of the leading element and having opposing bracket means extending from its free end; vertical pivot pins carried by said bracket means and defining a vertical axis; a second draft member rigidly attached to the front of the trailing element in opposing relationship to the first draft member; a ring assembly for coupling the draft members and for providing independent pitch and roll movements of the elements; said ring assembly including a first annular member having a V-shaped cross section and being pivotally mounted on said vertical pins, a second annular member concentric with said first annular member and being adapted for rotation within said first annular member, bearing means between said first and second annular members, a vertical column centrally disposed in said second annular member, and horizontal pivot pins mounted centrally in the sides of the column and in the adjacent portion of the second annular member; a yoke member pivotally mounted on the horizontal pins and being detachably connected to said second draft member; and horizontally disposed hydraulic actuator means on each side of said first draft member and pivotally connected to the exterior of the ring assembly for steering of the elements about the vertical pivot axis.

2. A coupling and steering mechanism for an articulated vehicle having a first element and a second element in tandem, said mechanism comprising: a first draft member rigidly attached to the rear of the first element; a tubular second draft member rigidly attached to the front of the second element in opposing relationship to the first draft member, said second draft member having opposing bracket means extending from its free end and carrying vertical pivot pins which define a vertical axis; a ring assembly for coupling the draft members and for providing independent pitch and roll movements of the elements; said ring assembly including a first annular member having a V-shaped cross section and being pivotally mounted on said vertical pins, a second annular member concentric with said first annular member and being adapted for rotation within said first annular member, bearing means between said first and second annular members, a vertical column centrally disposed in said second annular member, and horizontal pivot pins mounted centrally in the sides of the column and in the adjacent portion of the second annular member; a yoke member pivotally mounted on the horizontal pins and being detachably connected to said first draft member; and horizontally disposed hydraulic actuator means on each side of said second draft member and pivotally connected to the exterior of the ring assembly for steering of the elements about the vertical pivot axis.

3. An articulated vehicle comprising: a leading element; a trailing element; a tubular draft member rigidly attached to the rear of the leading element and having bracket means extending from its free end, said bracket means carrying vertical pivot pins which define a vertical axis; a second draft member rigidly attached to the front of the trailing element in opposing relationship to the first draft member; a ring assembly for coupling the draft members and for providing independent pitch and roll movements of the elements; said ring assembly comprising: a first annular member having a V-shaped cross section and being pivotally mounted on said vertical pins, a second annular member concentric with said first annular member and being adapted for rotation within said first annular member, a vertical column centrally disposed in said second annular member, and horizontal pivot pins mounted centrally in the sides of the column and in the adjacent portion of the second annular member; a yoke member pivotally mounted on the horizontal pins and being detachably connected to said second draft member; horizontally disposed hydraulic actuator means on each side of said first draft member and pivotally connected to the ring assembly for steering of the elements about the vertical pivot axis; a source of electrical power in one of said elements; electrical power transmission means between said elements, said means being extendable when the elements are detached; and electrical motor means for driving said elements.

4. An articulated vehicle comprising: a first element and a second element in tandem; a first draft member rigidly attached to the rear of the first element; a tubular second draft member rigidly attached to the front of the second element in opposing relationship to the first draft member, said second draft member having opposing bracket means extending from its free end and carrying vertical pivot pins which define a vertical axis; a ring assembly for coupling the draft members and for providing independent pitch and roll movements of the elements; said ring assembly including a first annular member pivotally mounted on said vertical pins, a second annular member concentric with said first annular member and being adapted for rotation within said first annular member, a vertical column centrally disposed in said second annular member, and horizontal pivot pins mounted centrally in the sides of the column and in the adjacent portion of the second annular member; a yoke member pivotally mounted on the horizontal pins and being detachably connected to said first draft member; horizontally disposed hydraulic actuator means on each side of said second draft member and pivotally connected to the ring assembly for steering of the elements about the vertical pivot axis; a source of electrical power in one of said elements; electrical power transmission means between said elements, said means being extendable when the elements are detached; and electrical motor means for driving said elements.

5. An articulated vehicle comprising: a leading element; a trailing element; a coupling mechanism for connecting said elements and for providing independent pitch and roll motions of the elements; electro-hydraulic steering means associated with the coupling mechanism for articulated steering of said elements; disconnect means in the coupling mechanism for detaching said elements; a mechanical power source and an alternator in one of said elements for generating electrical power; electrical power transmission means between said elements, said means being extendable when the elements are detached; and electrical drive means in each of said elements.

6. A main battle tank comprising: a leading, tracked element for carrying the main armament; a trailing tracked element for carrying tank support personnel; a tubular draft member rigidly attached to the rear of the leading element and having bracket means extending from its free end, said bracket means carrying vertical pivot pins which define a vertical axis; a second draft member rigidly attached to the front of the trailing element in opposing relationship to the first draft member; a ring assembly for coupling the draft members and for providing independent pitch and roll movements of the elements; said ring assembly including a first annular member having a V-shaped cross section and being pivotally mounted on said vertical pins, a second annular member concentric with said first annular member and being adapted for rotation within said first annular member, a vertical column centrally disposed in said second annular member, and horizontal pivot pins mounted centrally in the sides of the column and in the adjacent portion of the second annular member; a yoke member pivotally mounted on the horizontal pins and being detachably connected to said second draft member; horizontally disposed hydraulic actuator means on each side of said first draft member and pivotally connected to the ring assembly for steering of the elements about the vertical pivot axis; a source of electrical power in the trailing element; electrical power transmission means between said elements, said means being extendable when the elements are detached; and electrical motor means in each element for driving the tracks.

7. A tank according to claim 6, including dual steering control means in the leading element, and steering control means in the trailing element.

8. A main battle tank comprising: a leading tracked element for carrying the main armament; a trailing tracked element for carrying tank support personnel; a coupling mechanism connecting said elements and providing independent pitch and roll motions of the elements; electro-hydraulic steering means for articulated steering of said elements; disconnect means in the coupling mechanism for detaching said elements; a source of electrical power in one of said elements; electrical power transmission means between said elements, said means being extendable when the elements are detached; and electrical drive means in each of said elements for driving the tracks; dual steering control means in the leading element; and secondary steering control means in the trailing element.

9. A coupling and steering mechanism for an articulated vehicle having two elements in tandem, said mechanism comprising: a first draft member rigidly attached to one of said elements; a second draft member rigidly attached to the other of said elements in opposing relationship to the first draft member, said second draft member having opposing bracket means extending from its free end and carrying vertical pivot pins which define a vertical axis; a ring assembly for coupling the draft members and for providing independent pitch and roll movements of the elements; said ring assembly including a first annular member having a V-shaped cross section and being pivotally mounted on said vertical pins, a second annular member concentric with said first annular member and being adapted for rotation within said first annular member; bearing means between said first and second annular members; a vertical column centrally disposed in said second annular member and horizontal pivot pins mounted centrally in the sides of the column and in the adjacent portion of the second annular member; a yoke member pivotally mounted on the horizontal pins and being connected to said first draft member; and horizontally disposed actuator means extending from one of said elements and being pivotally connected to the exterior of the ring assembly for steering of the elements about the vertical pivot axis.

10. An articulated vehicle comprising: a leading element; a trailing element; a coupling mechanism for connecting said elements and for providing independent pitch and roll motions of the elements; actuator means associated with the coupling mechanism for articulated steering of said elements; disconnect means in the coupling mechanism for detaching said elements; a source of electrical power in one of said elements; electrical power transmission means between said elements, said means being extendable when the elements are detached; and electrical means for driving said elements.

(References on following page)

References Cited by the Examiner

UNITED STATES PATENTS

| | | |
|---|---|---|
| 293,735 | 2/84 | Henderson. |
| 435,983 | 9/90 | Stephens _____ 180—2 X |
| 1,332,067 | 2/20 | Rimailho _____ 180—14 X |
| 1,346,723 | 7/20 | Rimailho _____ 180—14 |
| 3,035,654 | 5/62 | Nuttal et al. _____ 180—14 |
| 3,078,942 | 2/63 | Wiebe _____ 180—77 X |

OTHER REFERENCES

Publication: "Dinah Does the Twist," Mechanical Engineering, May 1962, pages 69 and 70.

BENJAMIN HERSH, *Primary Examiner.*

LEO FRIAGLIA, *Examiner.*